(12) United States Patent
Majima et al.

(10) Patent No.: US 6,573,007 B2
(45) Date of Patent: Jun. 3, 2003

(54) MODIFIED GRAPHITE PARTICLES AND BATTERY USING THE SAME

(75) Inventors: Masatoshi Majima, Osaka (JP); Shinji Inazawa, Osaka (JP); Satoshi Ujiie, Osaka (JP); Eriko Yagasaki, Osaka (JP); Kazuharu Danjo, Okayama (JP); Shinichi Homma, Okayama (JP)

(73) Assignees: Sumitomo Electric Industries, Ltd., Osaka (JP); The Kansai Electric Power Company, Inc., Osaka (JP); Marutoyo Chuzai Seisakusho Co., Ltd., Okayama (JP)

( * ) Notice: Subject to any disclaimer, the term of this patent is extended or adjusted under 35 U.S.C. 154(b) by 0 days.

(21) Appl. No.: 09/897,118

(22) Filed: Jul. 3, 2001

(65) Prior Publication Data

US 2002/0018934 A1 Feb. 14, 2002

(30) Foreign Application Priority Data

Jul. 4, 2000 (JP) ........................... 2000-202569

(51) Int. Cl.[7] ............................................. H01M 4/02
(52) U.S. Cl. ................................................. 429/231.4
(58) Field of Search ........................ 429/231.8, 231.4; 423/448

(56) References Cited

FOREIGN PATENT DOCUMENTS

| EP | 0 917 223 | 5/1999 |
|----|-----------|--------|
| EP | 0 917 228 | 5/1999 |
| EP | 0 935 306 | 8/1999 |
| JP | 11-45715 | 2/1999 |
| JP | 11-045715 | 2/1999 |
| JP | 11-263612 | 9/1999 |
| WO | WO97 38459 | 10/1997 |

Primary Examiner—Carol Chaney
Assistant Examiner—Susy Tsang-Foster
(74) Attorney, Agent, or Firm—McDermott, Will & Emery

(57) ABSTRACT

Modified graphite particles are described, which have an almost circular and tabular shape, an average particle size Ap of 12 to 18 $\mu$m, a BET specific surface area Ss of 4 to 6 $m^2/g$, and a BET specific surface area to average particle size ratio, Ss/Ap, of 0.35 or less, and which are obtained by treating tabular particles of lumpy or flaky graphite to break or slightly fold the periphery of the tabular particles to increase the degree of circularity. A battery having the modified graphite particles as an anode active material is also described.

6 Claims, 2 Drawing Sheets

MODIFIED GRAPHITE PARTICLES AND BATTERY USING THE SAME

FIELD OF THE INVENTION

This invention relates to modified graphite particles suitable as an active material of batteries, such as nonaqueous secondary batteries, and a battery using the same as an active material.

BACKGROUND OF THE INVENTION

Nonaqueous secondary batteries using lithium ions have a high energy density and a high energy efficiency and provides a higher voltage than other types of batteries. Therefore, they have been studied chiefly for application as a small to ultra-small power source to small-sized and cordless electronic equipment, such as mobile phones, personal handyphone systems (PHSs) and notebook personal computers. Recently, they have also been expected as large batteries having a capacity exceeding 10 Ah that would be useful as a power source of electric cars or hybrid cars or as a small scale power storage means in houses, stores or small factories.

Nonaqueous secondary batteries heretofore used generally comprise metallic lithium as an anode active material. Recent years have seen development of nonaqueous secondary batteries which comprise an anode made of a porous carbon material as an active material in place of metallic lithium, a cathode made of a transition metal oxide containing or not containing lithium, and a nonaqueous organic electrolytic solution comprising a lithium salt electrolyte in a nonaqueous organic solvent. Nonaqueous secondary batteries of this type are now under study for practicability particularly as the above-mentioned large batteries.

The electrode reaction taking place during charging of the nonaqueous secondary batteries of the above type consists of deintercalation of lithium ions from the cathode active material into the electrolytic solution and intercalation of the lithium ions from the electrolytic solution into the porous carbon material of the anode. The electrode reaction during discharging consists of liberation of the lithium ions from the anode carbon material into the electrolytic solution and intercalation of the lithium ions from the electrolytic solution into the cathode active material.

These batteries possess not only the characteristics essential to the nonaqueous secondary batteries using metallic lithium as an anode active material, i.e., high energy density and high energy efficiency, but the merits of not using metallic lithium. That is, they are of high safety and free of such problems as possible reactions between metallic lithium and the electrolytic solution or so-called dendrite formation and are therefore expected to have an extended cycle life.

The porous carbon materials include coke, sintered resins, carbon fiber, pyrolytic carbon, natural graphite, artificial graphite, and mesophase spheres. Particularly preferred of them is natural or artificial lumpy or flaky graphite which is capable of intercalating a large quantity of lithium ions to provide a large theoretical charge and discharge capacity per unit weight.

However, graphite particles are amorphous and contain large particles with great scatter in particle size, which gives rise to the following problems if they are used as such.

(1) The packing density in the anode is low.

(2) Reaction sites in the charge/discharge reactions are concentrated on the angular edges of graphite particles, resulting in non-uniform reactions.

(3) The large specific surface area of graphite particles increases the loss of lithium ions which is attributed to formation of film of a lithium compound on the particle surface in the first charge and discharge cycle.

As a result, the charge/discharge capacity of the anode as a whole decreases, failing to approach to the theoretical capacity of graphite.

The film of a lithium compound as referred to above is considered to consist mainly of lithium fluoride, which is formed by electrodeposition of a lithium salt present in the organic electrolytic solution on the surface of graphite particles, and to contain lithium hydroxide, lithium carbonate, etc., which are formed by reaction between the lithium salt and surface water of the graphite particles or air.

In addition, the following problems arise from use of the amorphous graphite particles.

(4) Due to the above-described reduced charge/discharge capacity, particularly a reduced discharge capacity, lithium ions are gradually accumulated in the graphite particles with repetition of charges and discharges to increase the loss of lithium ions.

(5) Expansion and contraction of graphite particles on charging and discharging vary among particles, and the individual particles show anisotropy in expansion and contraction. Larger particles have larger expansion and contraction. Repetition of expansion and contraction of the particles in the anode tends to cause cracks, which interferes with electrical conduction.

As a result, the batteries have a reduced cycle life.

In order to solve these problems, modification of graphite particles to make them circular or spherical and classification to regulate the particle size within a narrow range have been studied.

For example, JP-A-11-45715 discloses modified graphite particles having a disc or a tablet form, which are obtained by spouting a liquid or gaseous dispersion of amorphous lumpy or flaky amorphous graphite particles from nozzles under pressure in a helical jet to make the particles collide against each other thereby to crush and round the particles and then regulating the particle size by classification. (The term "JP-A" as used herein means an "unexamined published Japanese patent application")

JP-A-11-263612 discloses modified graphite particles having a prescribed degree of circularity, the cross-section of which looks like a cabbage, which are obtained by a batch process comprising making flaky graphite particles to collide against each other by jet streams in a collision zone thereby to crush and round the particles while removing undersize particles by means of a cyclone type classifier provided above the collision zone.

According to these teachings, the modified graphite particles are expected to provide batteries with an improved charge/discharge capacity and an extended cycle life as compared with non-modified ones. Further, considered theoretically, repetition of the proposed modifying treatment or prolongation of the treating time ought to provide modified graphite particles having a higher degree of circularity and a smaller particle size with a reduced size variation, which are supposed to bring further improvements on both charge/discharge capacity and cycle life.

More specifically, it seems that an improvement in charge/discharge capacity can result for the following reasons.

(i) The packing density of graphite particles in the anode will increase with an increase in degree of circularity, a reduction in particle size, and a reduction in particle size variation.

(ii) As the degree of circularity increases, there will be less angular edges where the reaction sites of charge and discharge reactions may be concentrated, whereby the reactions in the anode will become more uniform.

(iii) The higher the degree of circularity, the smaller the specific surface area as calculated geometrically. As a result, the loss of lithium ions due to film formation on the particle surface will be reduced.

Regarding a cycle life, it is considered that an improvement can result for the following reasons.

(iv) The charge/discharge capacity, particularly the discharge capacity being thus improved, accumulation of lithium ions in graphite particles in repetition of charge and discharge cycles will be suppressed.

(v) With an increase in degree of circularity, a reduction in particle size, and a reduction in particle size variation, the difference among graphite particles in expansion and contraction on charging and discharging will be leveled; the isotropy of the individual particles in expansion and contraction will be improved; and the amount of expansion and contraction of the individual particles will be decreased. As a result, the anode hardly develops cracks due to repeated expansion and contraction.

According to the present inventors' investigation, when the modifying treatment as taught in each of the above-described related techniques was continued until the graphite particles are reduced in average particle size to about 18 μm or smaller, further prolongation of the cycle life was obtained. With regard to the charge/discharge capacity, however, it turned out that the capacity had reached its peak before the average particle size was reduced to the above-described level and further continuation of the treatment brought about no increase of the capacity.

SUMMARY OF THE INVENTION

An object of the present invention is to provide novel modified graphite particles which, when used as an anode active material, provides batteries having not only an excellent cycle life but the charge/discharge capacity further raised toward the theoretical capacity than as attained by those using conventionally proposed modified graphite particles.

Another object of the invention is to provide a novel battery which exhibits improved charge and discharge characteristics by using the above-described modified graphite particles.

First of all, the present inventors have investigated into configurational changes of graphite particles made by the conventional modifying treatments and found the following facts.

According as the conventional graphite particle modifying treatment proceeds to reduce the particle size, there is a tendency that a rate of size reduction ascribed to breakage of the tabular particles at their periphery becomes smaller than that ascribed to folding of the tabular particles. It follows that a tabular particle is folded several times into a cabbage-like particle as described in JP-A-11-263612.

However, folding a particle to reduce its size makes substantially no change in specific surface area. Therefore, the rate of reduction in specific surface area of graphite particles, which should accompany an increase of degree of circularity and has a great influence on the charge/discharge capacity of a battery, gradually slows down with the progress of the modifying treatment. In other words, the specific surface area of the resulting folded particle is far larger than estimated by geometric calculation based on what should have been achieved when a particle reduces its size by crush and breakage to increase its degree of circularity. As a result, a size reduction achieved by continuing the treatment is not accompanied with an expected increase in charge/discharge capacity.

It is the broken faces of a tabular graphite particle across the main planar direction of the particle that are ready to intercalate and deintercalate lithium ions. The broken face is, on the molecular level, the face where spaces between layers of 6-membered carbon rings, which are characteristic of graphite molecules, crop out to readily accept or release lithium ions. In this regard, particles folded into smaller particles do not expose much of their broken faces so that their capability of intercalating and deintercalating lithium ions is not exerted to the full. This seems to be one of the causes of the failure to sufficiently increase the charge/discharge capacity.

As a result of further investigation, the inventors have ascertained that graphite particles modified into almost circular and tabular particles by breaking or slightly folding their periphery have (1) more of broken faces ready to intercalate and deintercalate lithium ions exposed than the cabbage-like modified graphite particles and (2) a smaller specific surface area as estimated by geometric calculation in good agreement with the reduction in particle size and the increase in degree of circularity. The charge/discharge capacity of batteries using such particles as an anode active material further raises than as attained by conventional batteries and approaches the theoretical capacity more closely.

Based on this finding, the inventors have researched the range of an average particle size Ap (μm) and the range of a BET specific surface area Sc (m$^2$/g) of graphite particles that will secure further extension of the cycle life and further increase of the charge/discharge capacity than heretofore achieved. They have discovered as a result that specifying not only these ranges per se but their ratio, Ss/Ap, is effective for obtaining a further improvement on charge/discharge capacity of a battery while controlling an increase in total surface area of the particles packed up to make an anode. Further study about these ranges and their ratio have led the inventors to complete the present invention.

The present invention provides modified graphite particles having an almost circular and tabular shape, an average particle size Ap of 12 to 18 μm, a BET specific surface area Ss of 4 to 6 m$^2$/g, and a BET specific surface area to average particle size ratio, Ss/Ap, of 0.35 or less which are obtained by treating tabular particles of natural or artificial lumpy or flaky graphite to break or slightly fold the periphery of the tabular particles to increase the degree of circularity.

The present invention also provides a battery having the above-mentioned modified graphite particles as an anode active material. The battery of the invention has an improved cycle life and an improved charge/discharge capacity and, in particular, excellent discharge characteristics owing to the excellent characteristics of the modified graphite particles.

DETAILED DESCRIPTION OF THE INVENTION

The modified graphite particles of the invention are almost circular and tabular particles which are obtained by treating tabular particles of natural or artificial lumpy or flaky graphite to break or slightly fold the periphery of the tabular particles thereby to increase their degree of circularity.

The modified graphite particles of the invention have an average particle size Ap of 12 to 18 μm, a BET specific surface area Ss of 4 to 6 $m^2/g$, and an Ss/Ap of 0.35 or less.

Large particles whose Ap exceeds 18 μm show no improvement in packing density of the anode and still have angular edges due to insufficiency of the modifying treatment for increasing the degree of circularity, on which the reaction sites of the charge and discharge reactions are to be concentrated to make the reactions in the anode non-uniform. As a result, the charge/discharge capacity of a battery is reduced. Further, large particles expand and contract largely and exhibit high anisotropy in expansion and contraction. As a result, the anode develops cracks easily, causing a reduction in cycle life.

If the modified graphite particles have a specific surface area Ss more than 6 $m^2/g$ or an Ss/Ap more than 0.35, the loss of lithium ions due to film formation on the particle surface increases to reduce the charge/discharge capacity of a battery.

If the Ap is less than 12 μm, the packing density in the anode is too high, failing to secure sufficient interstices among particles. If the Ss is less than 4 $m^2/g$, the particles have reduced wettability with an organic electrolytic solution. In either case, a highly viscous nonaqueous organic electrolytic solution is not allowed to penetrate deep into the anode, resulting in reduction of charge and discharge density of a battery. Additionally there will be a difference in amount of expansion and contraction on charging and discharging between particles which are in contact with an organic electrolytic solution and those not, which can easily results in cracking of the anode to cause a reduction in cycle life.

In order to obtain batteries having a greater charge/discharge capacity than conventional batteries as well as an excellent cycle life, it is desirable that the Ap be about 12 to 16 μm, the Ss be about 4 to 5 $m^2/g$, and the Ss/Ap be about 0.33 to 0.34.

Figure 1:
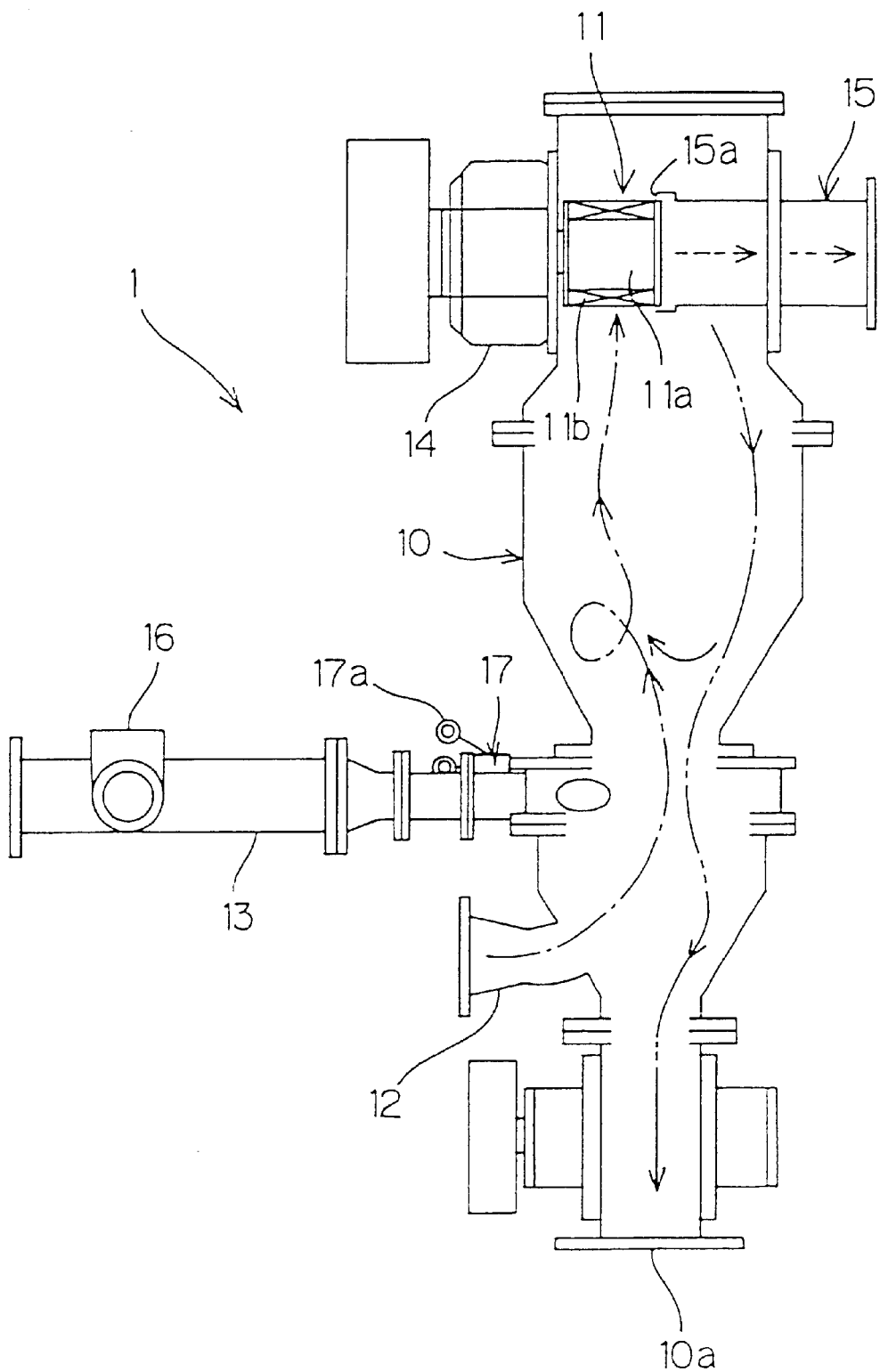
FIG. 1 is a schematic cross-section of an apparatus which can be used to produce the modified graphite particles of the present invention.

The modified graphite particles possessing the above-specified characteristics can be produced by continuously treating raw material particles by use of, for example, an air classifier 1 having a sirocco fan type abrasive classifying rotor 11 as shown in FIG. 1. The air classifier 1 comprises a vertical chamber 10 having the sirocco fan type abrasive classifying rotor 11 at the top thereof, a particle feed pipe 12 and an air feed pipe 13 slightly below the middle thereof, and an outlet 10a for collecting modified particles at the bottom thereof. Graphite particles to be modified are fed through the particle feed pipe 12 as dispersed in air. Air for secondary dispersion is fed through the air feed pipe 13 to uniformly disperse and raise the fed particles in the chamber 10 as shown by the one-dotted broken line.

The air classifier 1 also has a motor 14 for rotating the abrasive classifying rotor 11, a discharge pipe 15 which is disposed on the same axis of the rotor 11 with one of its openings open to the outside and the other opening 15a open to the inner space 11a of the rotor 11, through which fine particles (hereinafter described) are discharged, a Pitot tube 16 for measuring the speed of the air flow passing through the air feed pipe 13, and a flow control means 17 equipped with a variable-dispersion blade (not shown) which controls the flow rate of the air for secondary dispersion. Numeral 17a is a lever for adjusting the variable-dispersion blade.

In carrying out modifying treatment on natural or artificial graphite particles, the motor 14 is driven to rotate the abrasive classifying rotor 11 at a high speed, and air for secondary dispersion is fed through the air feed pipe 13 into the chamber 10 by operating a fan (not shown) and discharged through the discharge pipe 15.

Tabular graphite particles to be treated are blown into the chamber 10 through the feed pipe 12, whereupon they are uniformly dispersed by the air supplied from the air feed pipe 13 and rise in the chamber 10 as shown by the one-dotted broken like in FIG. 1. When the rising particles reach the rotor 11 rotating at a high speed, they collide against the vanes 11b of the rotor 11 and are broken or slightly folded at their periphery into almost circular and tabular particles. The particles thus modified and having gained in specific gravity fall by gravity in the chamber 10 as depicted by the two-dotted broken line and are collected through the outlet 10a.

Those particles which have not been sufficiently modified and therefore not gained in specific gravity join in the rising stream in the course of fall as indicated by the arrow (solid line) and are again subjected to the modification treatment.

Fine particles, i.e., fragments resulting from breakage of the periphery of raw material particles enter the inner space 11a of the rotor 11 through the gaps between vanes 11b and discharged out of the chamber 10 through the discharge pipe 15.

The modified graphite particles collected through the outlet 10a can be used in the manufacture of batteries either as they are or after classified if necessary.

Unlike the related conventional modifying treatments in which graphite particles are made to collide against each other, the modifying treatment according to the present invention makes the graphite particles collide against the vanes 11b of the abrasive classifying rotor 11 which is much heavier and larger than the particles and is rotating at a high speed. Therefore the energy applied to the graphite particles upon collision is far higher than achieved in the conventional treatments.

Because a rate of size reduction ascribed to breakage of the tabular particles at their periphery is kept higher than that ascribed to folding of the tabular particles, the resulting particles have an almost circular and tabular shape, the circularity or roundness of which owes to breakage of the periphery of the tabular particles or slight folding of the tabular particles. The modifying treatment can be performed in a continuous manner by use of the above-described apparatus thereby to accomplish improved treating efficiency compared with the conventional batch-wise treatments.

Conditions of the modifying treatment can be selected appropriately in accordance with such factors as the kind of a raw graphite material (whether it is natural or artificial, where a natural graphite occurs, or in what process an artificial graphite has been produced), the particle size, thickness or purity of the particles, and the like. Generally speaking, suitable conditions are about 3000 to 8000 rpm in rotating speed of the abrasive classifying rotor 11, about 80 to 150 kg/hr in feed rate of graphite particles, and about 15 to 25 $m^3$/min in flow rate of air for secondary dispersion.

The apparatus can be scaled up by fitting a plurality of the abrasive classifying rotors 11.

The modified graphite particles according to the present invention are suited for use as an anode active material of a battery. They are especially effective when applied to large nonaqueous secondary batteries having a capacity of 10 Ah or more, particularly of cell stack type. Having uniformity in shape, specific surface area and particle size, the modified graphite particles equalize the cells in expansion and contraction behavior on charging and discharging and charge/discharge characteristics, thereby extending the cycle life of the cell stack. The modified graphite particles reduce the loss in each cell thereby bringing about an improved charge/discharge capacity.

As a matter of course, the modified graphite particles of the invention are applicable to not only large batteries as stated above but small or ultra-small batteries for mobile phones, etc. They are also useful as an active material for other batteries than nonaqueous secondary batteries.

The battery assembly according to the present invention can have the same configuration as conventional ones except for using the modified graphite particles of the invention as an anode active material. For example, nonaqueous secondary batteries of stack type are made by alternately superposing a plurality of sheet anodes comprising the modified graphite particles and a plurality of sheet cathodes comprising a cathode active material with a separator, such as a porous film of polyethylene or polypropylene, interposed between every adjacent sheet electrodes to build up an electrode stack, which is sealed into a battery case together with a lithium-containing nonaqueous organic electrolytic solution. The anode is formed by applying an active material mixture containing the modified graphite particles on one or both sides of metal foil as an anode current collector.

The active material mixture further comprises an electrically conducting agent which assists electrical conduction among the modified graphite particles and between the modified graphite particles and a current collector and a binder which binds the modified graphite particles, the conducting agent, etc. to form a layer.

The conducting agent which can be used includes various powdered conductive materials resisting to an electrolytic solution, such as metal powder, metal compound powder, and carbon powder. In particular, carbon powder smaller than the modified graphite particles, having an average particle size of about 30 nm to 1 $\mu$m, is advantageous in that it is sufficiently effective in assisting electrical conduction and that it hardly agglomerates in dispersing to form a uniform active material mixture. The carbon powder can have a granular shape, a flaky shape or other various shapes. Flaky graphite powder is used suitably for its excellent electrical conductivity.

The binder which can be used includes various resins having resistance to an electrolytic solution, such as polyvinylidene fluoride (PVdF), polytetrafluoroethylene (PTFE), and fluororubber (FKM).

The mixing ratio of these components is decided taking into consideration the capacity, energy density and energy efficiency of a battery, resistance of the mixture to expansion and contraction on charging and discharging, and the like. For example, a suitable active material mixture comprises about 50 to 95%, particularly about 75 to 90%, by weight of the modified graphite particles, about 2.5 to 25%, particularly about 5 to 12.5%, by weight of carbon powder having an average particle size of 30 nm to 1 $\mu$m as a conducting agent, and about 2.5 to 25%, particularly 5 to 12.5%, by weight of the binder, based on the total weight of the active material mixture.

The active material mixture is mixed with a solvent, such as N-methyl-2-pyrrolidone, into paste, which is applied to one or both sides of metal foil as an anode current collector and dried to form an anode.

A cathode is formed in the same manner, except for using a cathode active material in place of the modified graphite particles. The cathode active material includes those capable of intercalating and deintercalating lithium ions, such as chalcogenides (e.g., oxides, sulfides or selenides) of transition metals and complex compounds of such chalcogenides and lithium.

Particularly suitable cathode active materials are at least one compound selected from the group consisting of compounds represented by formula (1), (2) or (3) shown below.

$$LiCo_bNi_{1-b}O_2 \quad (1)$$

wherein $0 \leq b \leq 1$.

$$LiAl_cCo_dNi_{1-c-d}O_2 \quad (2)$$

wherein $0 \leq c \leq 1$, $0 \leq d \leq 1$, and $0 < c+d \leq 1$.

$$LiMn_{2-e}M_eO_4 \quad (3)$$

wherein $0 < e < 0.1$, and M is at least one metal element selected from the group consisting of Al, Ni, Cr, Co, F, and Mg.

The metal foil used as a current collector in the cathode and the anode includes foil of various metals having excellent electric conductivity and excellent resistance to an electrolytic solution, such as aluminum, tin, nickel, copper, stainless steel, and titanium. Aluminum foil or tin foil, which is light, is preferred in view of the performance and energy density of nonaqueous secondary batteries.

The dimensions and shapes of the metal oil are selected appropriately according to the shape, structure and dimensions of a nonaqueous secondary battery in which the metal foil is used.

As previously noted, an electrode stack is formed by alternately superposing the cathode(s) and the anode(s) with a separator, such as a porous film of polyethylene or polypropylene, interposed between every adjacent electrodes. The lithium-containing organic electrolytic solution includes solutions or dispersions of a lithium salt, such as $LiClO_4$, $LiBF_4$, $LiPF_6$ or $LiAsF_6$, or a lithium ion conducting solid electrolyte, preferably $LiBF_4$ or $LiPF_6$ in a nonaqueous organic solvent having a high specific dielectric constant, such as ethylene carbonate, propylene carbonate, dimethyl carbonate, diethyl carbonate, ethyl methyl carbonate, 1,2-dimethoxyethane, or tetrahydrofuran.

The battery case in which the electrode stack and the organic electrolytic solution are sealed includes a metal housing as is conventionally employed. The battery case previously proposed by Majima, Yagasaki, et al. (some of the inventors of the present invention) in JP-A-10-334879 is also useful, which has a pressing member, such as a leaf spring, inserted between a battery case and an electrode stack to impose a given pressure in the thickness direction of the stack. The pressing member suppresses expansion of the electrode laminate and also functions as a cushion, making it possible to simplify the structure of the battery case.

A flexible bag container made of materials resistant to an electrolytic solution and impermeable to an organic solvent of the electrolytic solution and to external moisture is also useful. Much lighter than metallic housings, such a bag container brings about a marked improvement on energy density per unit weight (Wh/kg). While not limiting, the flexible bag is preferably made of a laminate film comprising a polyolefin resin layer having excellent impermeability to organic solvents and a metal layer having excellent impermeability to water.

The polyolefin resin layer includes a polyethylene film, a polypropylene film, and a composite film of such a polyolefin resin film and a film having excellent thermal adhesion to metal, such as polyethylene terephthalate. The metal of the metal layer includes aluminum, nickel, stainless steel, and titanium which are excellent in water impermeability and resistance to an electrolytic solution. From the standpoint of lightness, aluminum is suitable.

The olefin resin film making the bag container can contain hydrotalcite, magnesium sulfate, etc. as a water- or Lewis acid-scavenger for improving the battery life. Hydrotalcite, magnesium sulfate, etc. may be sealed into a battery case, either a metallic case or a flexible bag container, together with the electrode stack and the electrolytic solution. The bag container may have a protective frame made of an electrolytic solution-resistant material, such as PVdF, PTFE or metals, disposed around the electrode stack.

For the purpose of protection from damage during use, the nonaqueous secondary battery using the above-described bag container is preferably put into a solid housing, such as a separate hard case similar to a conventional battery case, a hole made under the floor, inside the wall or above the ceiling of a house as a place to put batteries in, and a frame made in a chassis or a body of an electric car.

In order to suppress expansion of the electrode stack on charging and discharging, a pressing member comprising a leaf spring and a flat pressing plate, etc. may be put into the above-described solid housing. The nonaqueous secondary battery can be disposed in the solid housing not vertically but horizontally with a weight put thereon as a pressing member to apply pressure in the thickness direction of the stack. The solid housing can be designed to have slightly larger inner dimensions than the outer dimensions of the battery so that its rigidity may function as a pressing means for suppressing expansion of the electrode stack.

The nonaqueous secondary battery preferably has a capacity of about 10 to 1000 Ah, particularly about 50 to 1000 Ah. A higher capacity will be obtained by combining two or more batteries.

The present invention will now be illustrated in greater detail with reference to Examples and Comparative Examples. In Examples and Comparative Examples, all the parts are by weight unless otherwise noted. The average particle size Ap of modified graphite particles prepared was measured with Microtrack FRA supplied by Nikkiso Co., Ltd., and the specific surface area Ss was measured by a BET method (fluid method) with Macksorb supplied by Mountec.

EXAMPLE 1

Flaky graphite particles NG12, available from Kansai Netukagaku K. K., were continuously treated in the air classifier 1 shown in FIG. 1. The rotating speed of the abrasive classifying rotor 11 and the flow rate of air for secondary dispersion fed from the air feed pipe 13 were adjusted according to the throughput of the graphite particles fed from the particle feed pipe 12 per unit time.

Figure 2:
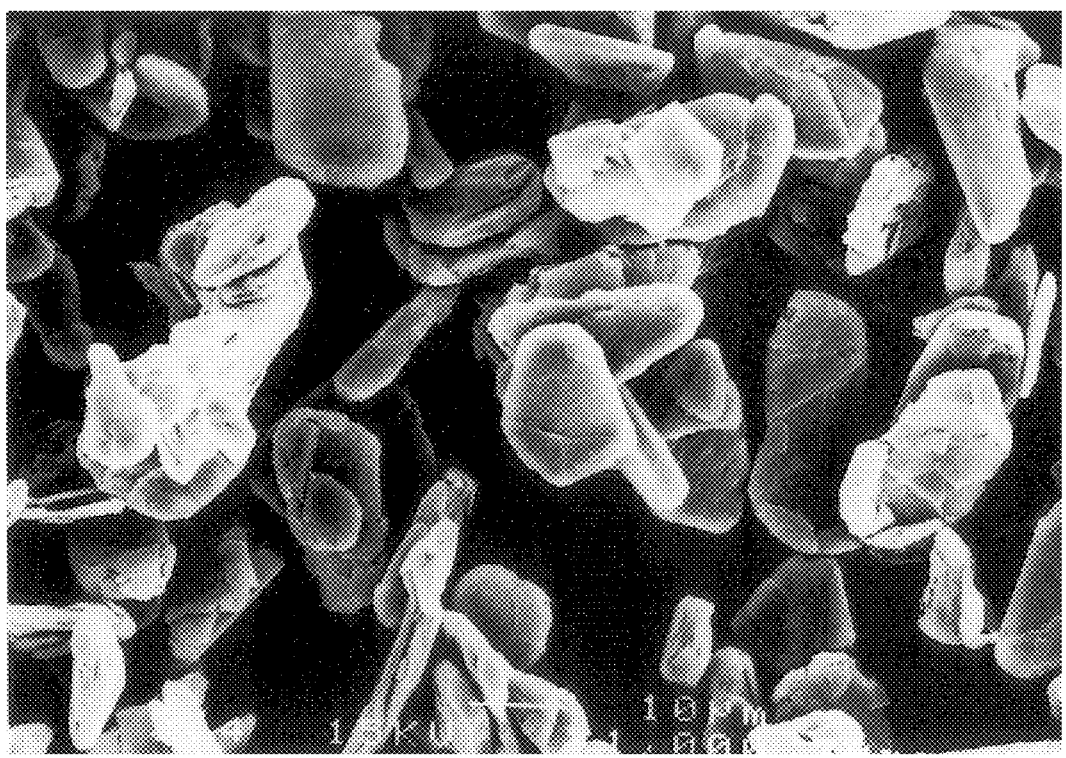
FIG. 2 is a scanning electron micrograph of the modified graphite particles obtained in Example 1.

The resulting modified graphite particles had an average particle size Ap of 12 $\mu$m and a BET specific surface area Ss of 4.1 m$^2$/g, giving an Ss/Ap of 0.342. An electron micrograph of the modified graphite particles is shown in FIG. 2. It is seen that the particles had been broken or slightly folded at their periphery into almost circular and tabular particles.

EXAMPLE 2

Modified graphite particles were obtained in the same manner as in Example 1, except for using flaky graphite particles NG 18, available from Kansai Netukagaku K. K. The resulting modified graphite particles had an average particle size Ap of 18 $\mu$m and a BET specific surface area Ss of 5.8 m$^2$/g, giving an Ss/Ap of 0.322. Electron microscopic observation revealed that the particles had been broken or slightly folded at their periphery into almost circular and tabular particles similarly to Example 1.

COMPARATIVE EXAMPLE 1

Flaky graphite particles NG7 available from Kansai Netsukagaku K. K. were modified according to the method taught in JP-A-11-45715. The resulting modified graphite particles had an average particle size Ap of 7 $\mu$m and a BET specific surface area Ss of 3.9 m$^2$/g, giving an Ss/Ap of 0.557. Electron microscopic observation of the modified particles revealed a cabbage-like appearance formed by folding the tabular raw particles twice or more.

COMPARATIVE EXAMPLE 2

Flaky graphite particles NG20 available from Kansai Netsukagaku K. K. were modified according to the method disclosed in JP-A-11-263612. The resulting modified graphite particles had an average particle size Ap of 20 $\mu$m and a BET specific surface area Ss of 7.6 m$^2$/g, giving an Ss/Ap of 0.38. Electron microscopic observation of the modified particles revealed a cabbage-like appearance formed by folding the tabular raw particles twice or more similarly to Comparative Example 1. Test for confirming irreversible capacity:

(1) Preparation of anode

Ten parts of the modified graphite particles prepared in Examples 1 and 2 and Comparative Examples 1 and 2 and 2 parts of PVdF powder were mixed, and the mixture was kneaded with N-methyl-2-pyrrolidone into paste. The paste was applied to one side of a 20 $\mu$m thick copper foil to a dry coating weight of 0.01 g/cm$^2$, heated to 150° C. to remove N-methyl-2-pyrrolidone, and rolled to reduce the thickness of the active material layer to 60% of the initial thickness. The resulting sheet was cut into 20-cm squares.

(2) Assembly into battery for evaluation

The anode and a metallic lithium foil of the same size (20-cm square) as a cathode were superposed with the anode active material layer facing the cathode with a 25 $\mu$m thick polyethylene porous film as a separator interposed therebetween to prepare an electrode laminate.

LiPF$_6$ was dissolved in a 1:1 (by volume) mixture of ethylene carbonate and diethyl carbonate to prepare a nonaqueous organic electrolytic solution having an electrolyte concentration of 1 mol/dm$^{-3}$. The electrolytic solution was penetrated into the electrode laminate to make up a battery.

(3) Measurement of first cycle irreversible capacity

The battery was charged to a DOC of 100% and a cut-off voltage of 4.1 V and then discharged to 3 V at a 0.1 C rate to calculate a Coulomb efficiency. The results obtained are shown in Table 1 below.

TABLE 1

| | Coulomb Efficiency (%) |
|---|---|
| Example 1 | 96.8 |
| Example 2 | 96.5 |
| Compara. Example 1 | 92.3 |
| Compara. Example 2 | 82.3 |

As can be seen from Table 1, batteries using the modified graphite particles of Examples 1 and 2 have a higher first cycle Coulomb efficiency, i.e., a smaller first cycle irreversible capacity thereby securing a higher battery capacity after the first cycle as compared with the batteries using the conventional modified graphite particles of Comparative Examples 1 and 2.

EXAMPLES 3 AND 4 AND COMPARATIVE EXAMPLES 3 AND 4

(1) Preparation of anode

Anodes were prepared in the same manner as described above.

(2) Preparation of cathode

Ten parts of lithium cobaltate powder, 1 part of flaky graphite powder having an average particle size of 0.6 $\mu$m, and 1 part of PVdF were mixed, and the mixture was kneaded with N-methyl-2-pyrrolidone to prepare paste. The paste was applied to both sides of a 20 $\mu$m thick aluminum foil to a dry coating weight of 0.03 g/cm$^2$ per side, heated to 150° C. to remove N-methyl-2-pyrrolidone, and rolled to reduce the thickness of the active material layer to 80% of the initial thickness. The resulting sheet was cut into 20-cm squares.

(3) Assembly into battery

Three hundred and sixty cathodes and the same number of the anodes were alternately stacked up with a 25 $\mu$m thick polyethylene porous film as a separator interposed between every adjacent electrodes to make an electrode stack.

The same nonaqueous organic electrolytic solution as used above was penetrated into the electrode stack to make a stack type nonaqueous secondary battery.

(4) Cycle life test

The batteries were charged to a DOC of 70% and a cut-off voltage of 4.1 V and then discharged to 3 V at a 0.1 C rate. The number of the charge/discharge cycles that could be repeated until the charge capacity reduced to 70% of the initial one (cycle life) was recorded. The results are shown in Table 2 below.

TABLE 2

| | Modified Graphite Particles | Cycle Life |
|---|---|---|
| Example 3 | Example 1 | 3500 |
| Example 4 | Example 2 | 3000 |
| Compara. Example 3 | Compara. Example 1 | 2000 |
| Compara. Example 4 | Compara. Example 2 | 1500 |

It has now been proved that the modified graphite particles according to the present invention provide nonaqueous secondary batteries with an extended cycle life compared with the conventional modified graphite particles.

While the invention has been described in detail and with reference to specific embodiments thereof, it will be apparent to one skilled in the art that various changes and modifications can be made therein without departing from the spirit and scope thereof.

What is claimed is:

1. A battery having an anode active material comprising uncoated modified natural or artificial graphite particles having an almost circular and tabular shape, an average particle size Ap of 12 to 18 $\mu$m, a BET specific surface area Ss of 4 to 6 m$^2$/g, and a BET specific surface area to average particle size ratio, Ss/Ap, of 0.35 or less, said uncoated modified graphite particles obtained by treating tabular particles of natural or artificial flaky graphite to break or slightly fold the periphery of said tabular particles to increase the degree of circularity.

2. The battery as claimed in claim 1, wherein the Ap is 12 to 16 $\mu$m.

3. The battery as claimed in claim 1, wherein the Ss is 4 to 5 m$^2$/g.

4. The battery as claimed in claim 1, wherein the Ss/Ap is 0.33 to 0.34.

5. The battery as claimed in claim 1, wherein said battery is a nonaqueous secondary battery of cell stack type.

6. The battery as claimed in claim 1, wherein said graphite particles are produced by use of an air classifier having a sirocco fan type abrasive classifying rotor.

* * * * *